May 31, 1932.  H. R. WEBB ET AL  1,860,878
DEVICE FOR BALANCING BODIES CAPABLE OF A RISING AND FALLING MOVEMENT
Filed June 14, 1930
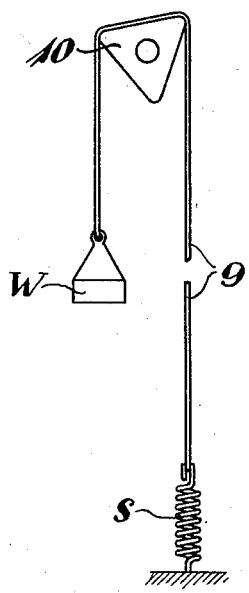
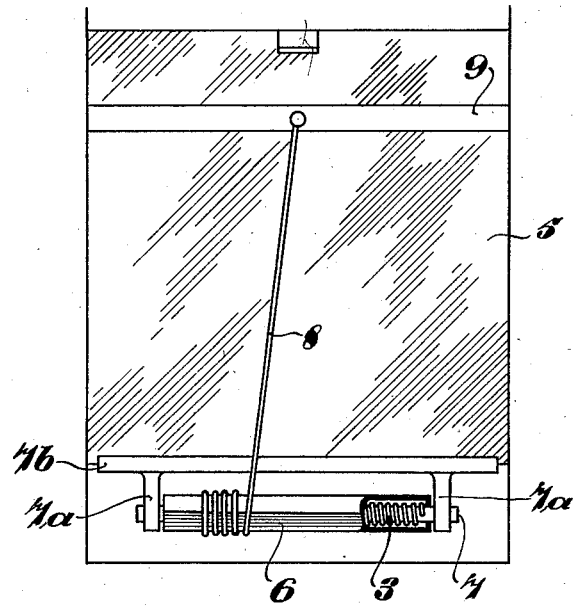
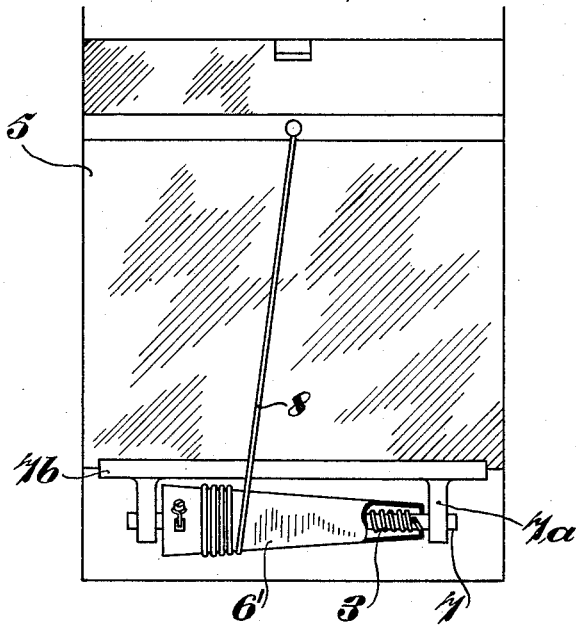
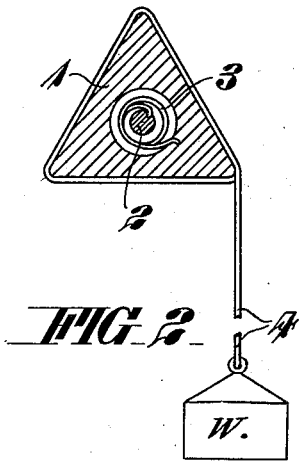
INVENTORS
H. R. Webb,
H. N. Webb,
BY Barker & Collings
ATTORNEYS Patented May 31, 1932

1,860,878

UNITED STATES PATENT OFFICE

HARRY RILEY WEBB AND HARRY NEWTON WEBB, OF GRANTHAM, ENGLAND

DEVICE FOR BALANCING BODIES CAPABLE OF A RISING AND FALLING MOVEMENT

Application filed June 14, 1930. Serial No. 461,246.

This invention comprises an improved device for balancing bodies capable of a rising and falling movement. In the specification of my co-pending application for patent, Serial No. 369,477, filed June 8, 1929, of which this case is a continuation in part it has been proposed to secure equilibrium between a body to be balanced and a balancing device such as a spring at successive positions throughout the range of movement of the body, said means comprising in one instance a chain or similar link member adapted to be wound onto or from a spring actuated drum, the angular positions taken up by the chain links in passing over said drum causing a cyclic variation in the moments of the forces applied to the balancing spring interiorly of said drum, by the weight of the body to be balanced.

The principal object of the present invention is to provide means whereby a link chain may be replaced by a flexible inextensible member such as a cord or rope and to provide an improved and simplified construction.

A further object is to provide means whereby the variation in the opposing force of the balancing spring, as same becomes more highly tensioned, may be compensated for, and in order to attain this end means are provided for combining a progressive variation with the cyclic variation in the moments of the forces applied to the balancing means by the weight of the body to be balanced, so as to constitute a cyclic variation in such moments having progressively increasing upper and lower limits; the progressive increase in such limits corresponding wholly or in part to the variation in the balancing force exerted by the spring or similar balancing means, as same becomes more highly tensioned.

A still further object of the present invention is to provide means of a simple and cheaply constructed nature functioning to maintain an effective balance at successive and separated positions throughout the range of movement of the body.

Further objects are attained by the particular construction and arrangement of parts forming the present invention, which objects will be more fully apparent after a consideration of the accompanying specification in connection with the attached drawings wherein:—

Fig. 1 illustrates diagrammatically one form of the invention.

Fig. 2 illustrates diagrammatically a modified form of the invention and,

Figs. 3 and 4 illustrate practical embodiments to the invention, applied, for example to a displaceable window or the like.

In the arrangement illustrated in Fig. 1 a freely rotatable polygonal drum or spindle 10 is provided over which a flexible cord or rope 9 is passed, the body to be balanced W and the balancing spring S being connected to the depending ends of said cord or rope 9. On displacement of the body W the drum 10 is rotated, and by virtue of this being of polygonal form the distance between the centre of rotation thereof and the line of action of the cord 9 on the two sides varies in a cyclic manner and it will be appreciated that, as long as the effective force exerted by the spring S lies intermediate the upper and lower limits of the cyclic variations applied thereto by the weight of the body W to be balanced through the intermediary of cord 9, equilibrium may be attained during each period of cyclic variation and thus at a comparatively great number of positions throughout the range of movement of the body.

In the arrangement illustrated in Fig. 2 a polygonal drum 1 is provided, for example, of triangular form and is rotatable around a stationary central spindle 2 accommodating a spring 3 connected at one end to the drum 1 and at the other to the spindle 2. A flexible inextensible cord 4 is secured at one end to said drum and is wound onto or from said drum 1 on displacement of the body W to be balanced and it will be appreciated that the distance between the line of action of the cord 4 and the centre of the drum 1 is continually varying throughout the movement of the body W and that in effect the moments of the force applied to spring 3 by the weight of the body W reach upper and lower limits three times during each revolution of the drum 1. If, however, the drum 1 had been of a pentagonal form instead of triangular form, upper and lower limits would have been reached five times in each revolution of the drum.

A cyclic variation is thus produced in the moments of the forces applied by the weight of the body W to the balancing spring 3 and the arrangement is such that the effective force exerted by the spring 3 always lies intermediate the upper and lower limits of such cyclic variation. In this manner it will be appreciated that equilibrium between the opposing forces can be attained at a certain position during each cyclic variation and further that if the body W is moved to any desired position same will subsequently automatically move to such positions that equilibrium between the opposing forces is attained.

Fig. 3 illustrates the application of the present invention to a displaceable window or the like such, for example, as those commonly utilized in automobiles. Below the window 5 there is provided a rotatable polygonal drum 6 mounted on a spindle 7 carried in bearing brackets 7a secured to a channel member 7b rigidly associated with the lower edge of the window 5. A flexible cord or rope 8 is wound onto the drum 6 and is connected to a stationary point or attachment on a transverse stationary cross-bar 9 above the drum 6 at all positions in its movement. It will thus be appreciated that a lifting force is imparted to the window 5 through the cord 8 from the balancing spring 3 and further that by virtue of the provision of the polygonal faces of the drum 6, on displacement of the window, a cyclic variation is produced in the moments of the force applied to the spring 3 by the weight of the window 5. The arrangement is such that the effective balancing force exerted by the spring 3 always lies intermediate the upper and lower limits of such cyclic variation and if this condition is fulfilled equilibrium may be attained throughout the range of movement of the window 5.

The embodiment illustrated in Fig. 4 of the drawings illustrates means whereby the variable balancing force exerted by spring 3 as same becomes more highly tensioned is wholly or in part compensated. In this case the reference characters are the same as those utilized in connection with Fig. 3 of the drawings, the chief feature in the present embodiment lying in the provision of a polygonal drum 6' of longitudinally tapering form. On displacement of the window 5 the cord 8 is wound onto or from progressively varying diameters of the drum 6' and thus there is provided, in addition to the cyclic variation in the moments of the forces applied to the spring 3 by the weight of the window 5 by virtue of the polygonal surface of the drum 6', a further gradual i. e. non-cyclic variation in such moments and this variation is arranged to correspond to and compensate for the variation in the balancing force exerted by the spring 3. In other words by this arrangement the moments of the forces applied to the spring 3 by the weight of the body to be balanced vary cyclically, such cyclic variations having progressively increasing upper and lower limits and the variation in such upper and lower limits compensating for the increase in the force exerted by spring 3 as same becomes more highly tensioned.

In this case the principal function of the cyclic variations in the moments of the forces applied to the spring 3 is to prevent vibrational or other influences from initiating a displacement of the window 5, the progressive variation in this case compensating for the increase in the spring force. The range of this cyclic variation may however, in this case conveniently be considerably less than in the arrangement illustrated in the other figures of the drawings and for this purpose a greater number of faces may be provided on the drum 6'. The reason for this difference is that in the other figures of the drawings there has to be provided a comparatively large range of the cyclic variations in the moments of the forces applied to the drum, in order that the variable balancing force exerted by the spring 3 or S at its various positions may always lie intermediate the limits of such variations, whereas in the case of Fig. 4 the variation in the spring force is compensated as already described by virtue of the provision of the tapering polygonal roller and consequently a smaller cyclic range in the moments of the forces applied to the balancing spring suffices.

I claim:—

1. A device for balancing bodies adapted for a rising and falling movement by balancing means exerting an inconstant balancing force comprising a rotatable drum of polygonal exterior form and a flexible inextensible connecting member passing over said polygonal drum connected at one end with the balancing means and at the other end with the body to be balanced, the continually varying distance between the line of action of the connecting cord at its points of contact with the drum and the centre of rotation of the drum causing on rotation of such drum a cyclic variation in the moments of the forces applied to the balancing means by the weight of the body to be balanced and the effective moment of force exerted by the balancing means always lying intermediate the upper and lower limits of such cyclic variation.

2. A device for balancing bodies adapted for a rising and falling movement by balancing means exerting an inconstant balancing force comprising a rotatable drum of polygonal exterior form, a stationary spindle adapted to accommodate said drum, a spring mounted interiorly of said drum and adapted to impart a rotational force in one direction thereto, a flexible connecting cord wound onto said polygonal drum, secured at one end thereto and adapted to impart a rotational force in the opposite direction to said drum, means for applying the weight of the body to be balanced to the free end of said connecting cord and said polygonal drum causing on rotation a cyclic variation in the moments of the forces applied to the spring interiorly thereof and the effective balancing moment of force exerted by such spring always lying intermediate the upper and lower limits of such cyclic variation.

3. A device for balancing bodies adapted for a rising and falling movement by balancing means exerting an inconstant balancing force comprising a spring actuated drum below the body to be balanced and displaceable therewith, a connecting cord adapted to be wound onto or from said drum on displacement of the body, a stationary point above said drum to which the free end of said connecting cord is connected and the polygonal faces of said drum causing a cyclic variation in the moments of the forces applied to the spring interiorly thereof on displacement of the body and the effective balancing moment of force exerted by such spring always lying intermediate the upper and lower limits of such cyclic variation.

4. A device for balancing bodies adapted for a rising and falling movement by balancing means exerting an inconstant balancing force comprising a rotatable drum displaceable with the body to be balanced incorporating a polygonal outer surface, a stationary spindle on which said drum may be accommodated, means for attaching said stationary spindle to the lower edge of the body to be balanced and a flexible connecting means wound onto said drum and connecting with a stationary point above said drum, the polygonal faces of said drum causing on displacement of the body a cyclic variation in the moments of the forces applied to the balancing spring interiorly of said drum by the weight of the body to be balanced, and the effective balancing moment of force exerted by the spring always lying intermediate the upper and lower limits of such cyclic variation.

5. A device for balancing bodies adapted for a rising and falling movement by balancing means exerting an inconstant balancing force comprising a polygonal drum of longitudinally tapering form mounted below the body to be balanced and displaceable therewith, a spring interiorly of said drum tending to impart a rotational force thereto, a flexible connecting cord wound onto the outer surface of said drum and secured at one end thereto so as to co-act with progressively varying diameters of such drum in accordance with the position of the body in its movement and a stationary point above said drum to which the free end of said connecting cord is connected, the tapering polygonal drum causing a combined cyclic and a progressive non-cyclic variation in the moments of the forces applied on displacement of the body to the spring interiorly of the drum by the weight of such body to be balanced, and the effective balancing moment of force exerted by such spring always lying intermediate the upper and lower limits of such cyclic variation.

6. A device for balancing bodies adapted for a rising and falling movement by balancing means exerting an inconstant balancing force comprising a rotatable drum of longitudinally tapering form and of polygonal exterior section mounted below the body to be balanced and displaceable therewith, a stationary spindle rigidly associated with the lower edge of the body to be balanced and about which said drum is capable of rotational movement, a coiled spring secured at one end to said spindle and at the other end to said drum adapted to impart a rotational force to said drum in one direction, a flexible connecting cord wound onto or from the outer face of said drum and secured at one end thereto in order to impart a rotational force to said drum in the opposite direction and a stationary point above said drum to which the free end of said connecting cord is connected, the drum on displacement of the body causing the combined cyclic and a gradual non-cyclic variation in the moments of the forces applied to the spring interiorly of the drum by the weight of the body to be balanced and the effective balancing moment of force exerted by such spring always lying intermediate the upper and lower limits of said cyclic variation.

HARRY RILEY WEBB.
HARRY NEWTON WEBB.